US012135115B1

(12) United States Patent
Huang et al.

(10) Patent No.: US 12,135,115 B1
(45) Date of Patent: Nov. 5, 2024

(54) SMART PROJECTION VEHICLE LAMP

(71) Applicant: TAIWAN COLOR OPTICS, INC., Taichung (TW)

(72) Inventors: Kuo-Yin Huang, Taichung (TW); Ke-Peng Chang, Taichung (TW); Chih-Feng Wang, Taichung (TW); Hsin-An Chen, Taichung (TW); Yung-Peng Chang, Taichung (TW)

(73) Assignee: TAIWAN COLOR OPTICS, INC., Taichung (TW)

( * ) Notice: Subject to any disclaimer, the term of this patent is extended or adjusted under 35 U.S.C. 154(b) by 0 days.

(21) Appl. No.: 18/614,306

(22) Filed: Mar. 22, 2024

(30) Foreign Application Priority Data

Dec. 14, 2023 (TW) ................................ 112148658

(51) Int. Cl.

| | |
|---|---|
| ***F21V 9/30*** | (2018.01) |
| ***F21S 41/176*** | (2018.01) |
| ***F21S 41/25*** | (2018.01) |
| ***F21S 41/675*** | (2018.01) |

(52) U.S. Cl.

CPC .......... *F21S 41/675* (2018.01); *F21S 41/176* (2018.01); *F21S 41/25* (2018.01)

(58) Field of Classification Search

CPC .... H01S 5/32341; H01S 5/4025; H01S 5/005; H01S 5/0071; H01S 5/02; H01S 5/02212; H01S 5/02253; H01S 5/02326; H01S 5/02469; H01S 5/4012; H01S 5/4075; H01S 5/0087; F21S 41/176; F21V 9/35; F21V 7/0008; B64D 47/02

See application file for complete search history.

(56) References Cited

U.S. PATENT DOCUMENTS 11,175,007 B1 * 11/2021 Vankayala ............. B64D 47/02
2018/0292059 A1 * 10/2018 Nagamori .............. F21S 41/36

* cited by examiner

*Primary Examiner* — Elmito Breval

(74) *Attorney, Agent, or Firm* — Li & Cai Intellectual Property (USA) Office

(57) ABSTRACT

A smart projection vehicle lamp includes laser light sources, two-dimensional MEMS mirrors, focusing lenses, a reflective phosphor plate, a narrow-band blue light reflector, and a lens group. The two-dimensional MEMS mirrors are correspondingly arranged on paths of laser light beams of the laser light sources. The laser light beams are dynamically reflected by the two-dimensional MEMS mirrors. The reflective phosphor plate has a phosphor layer and a reflective layer located on one side of the phosphor layer. The narrow-band blue light reflector is disposed between the focusing lenses and the reflective phosphor plate, and has a reflective band and a transmissive band. The converged laser light beams are reflected by the reflective band and illuminate the reflective phosphor plate. The laser light beams excite the phosphor layer and are mixed into visible light reflected by the reflective layer and passes through the transmissive band to be emitted outward.

10 Claims, 9 Drawing Sheets

SMART PROJECTION VEHICLE LAMP

CROSS-REFERENCE TO RELATED PATENT APPLICATION

This application claims the benefit of priority to Taiwan Patent Application No. 112148658, filed on Dec. 14, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a smart projection vehicle lamp, and more particularly to a vehicle headlamp that utilizes a laser light source to scan and illuminate an illumination area in front of a vehicle, and to project corresponding symbols for the movement or turning of the vehicle.

BACKGROUND OF THE DISCLOSURE

Conventional projection-type vehicle lamps include multiple laser light sources that have large volumes and occupy a large space. In addition, after multiple reflections, luminous efficiencies of the multiple laser light sources are reduced. Thus, how to reduce the size and improve the luminous efficiency for the projection-type vehicle lamps has become an issue to be addressed.

In addition, in view of the recent frequent occurrence of traffic accidents, by the vehicle lights additionally projecting corresponding symbols of the vehicle forward movement or vehicle turning movement on the ground to alert pedestrians or other vehicles, traffic safety may be further promoted.

SUMMARY OF THE DISCLOSURE

In response to the above-referenced technical inadequacies, the present disclosure provides a smart projection vehicle lamp.

In order to solve the above-mentioned problems, one of the technical aspects adopted by the present disclosure is to provide a smart projection vehicle lamp. The smart projection vehicle lamp has a lens optical axis. The smart projection vehicle lamp includes a plurality of laser light sources, a plurality of two-dimensional micro-electromechanical system (MEMS) mirrors, a plurality of focusing lenses, a reflective phosphor plate, a narrow-band blue light reflector, and a lens group. The plurality of two-dimensional MEMS mirrors are correspondingly arranged on paths of a plurality of laser light beams of the plurality of laser light sources. The plurality of laser light beams are dynamically reflected by the plurality of two-dimensional MEMS mirrors. The plurality of focusing lenses are configured to converge the plurality of laser light beams reflected by the plurality of two-dimensional MEMS mirrors. The reflective phosphor plate has a phosphor layer and a reflective layer. The reflective layer is located on one side of the phosphor layer.

The narrow-band blue light reflector is disposed between the plurality of focusing lenses and the reflective phosphor plate. The narrow-band blue light reflector is configured to reflect blue wavelength light in the laser light source while allowing part of visible light to pass through the narrow-band blue light reflector, and the plurality of laser light beams that are converged are reflected by the narrow-band blue light reflector to illuminate the reflective phosphor plate. The plurality of laser light beams excite the phosphor layer and are mixed into visible light, and the visible light is reflected by the reflective layer of the reflective phosphor plate to pass through the narrow-band blue light reflector. The narrow-band blue light reflector is disposed between the lens group and the reflective phosphor plate.

Therefore, the smart projection vehicle lamp provided by the present disclosure includes the plurality of laser light sources that are used in cooperating with the plurality of two-dimensional MEMS mirrors. By the plurality of laser light beams being reflected by the narrow-band blue light reflector, different sections can be scanned on the reflective phosphor plate to form a plurality of projection light patterns that correspond to at least a symbol projection mode.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
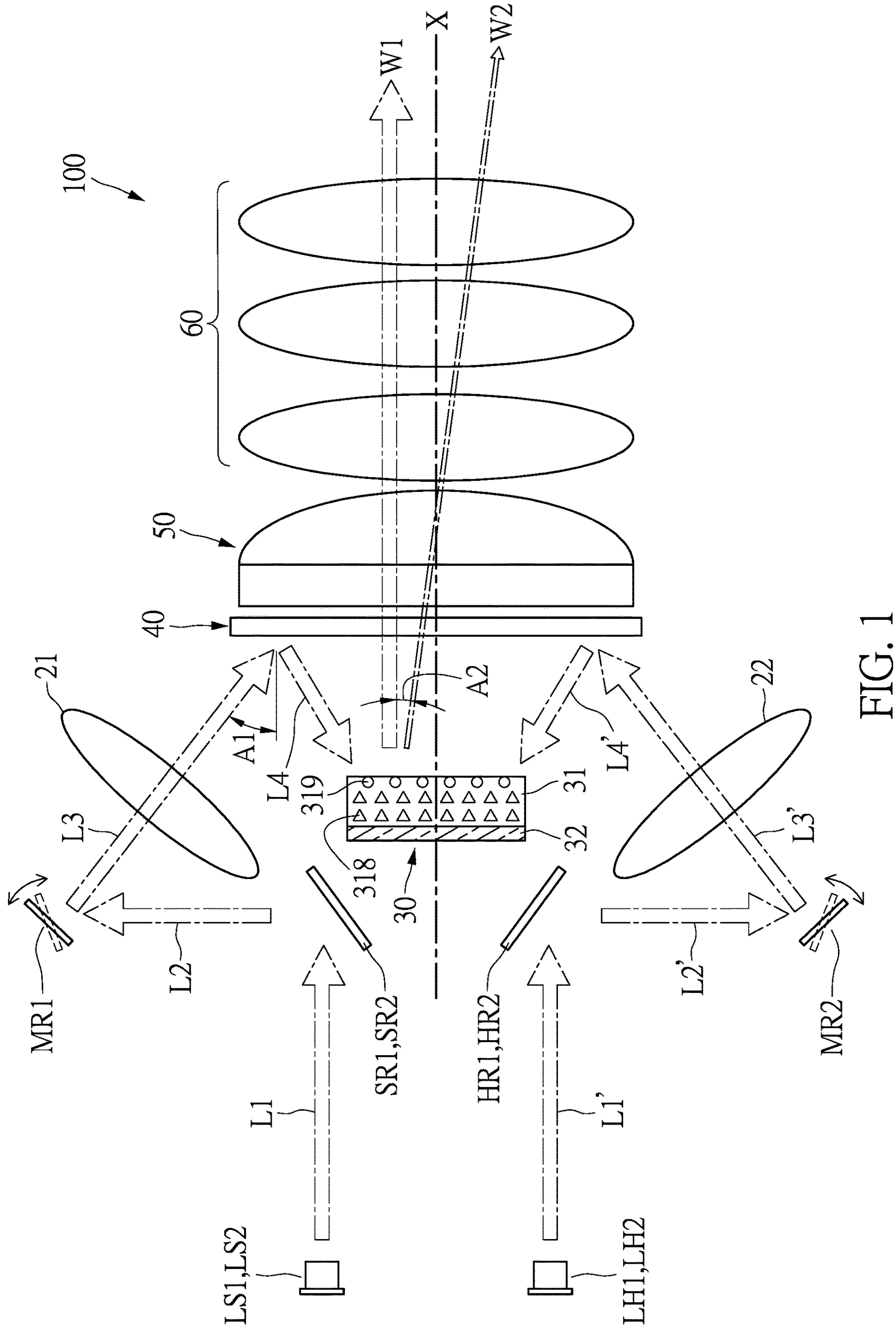
FIG. 1 is a schematic side view of a smart projection vehicle lamp according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

EMBODIMENTS

Figure 2:
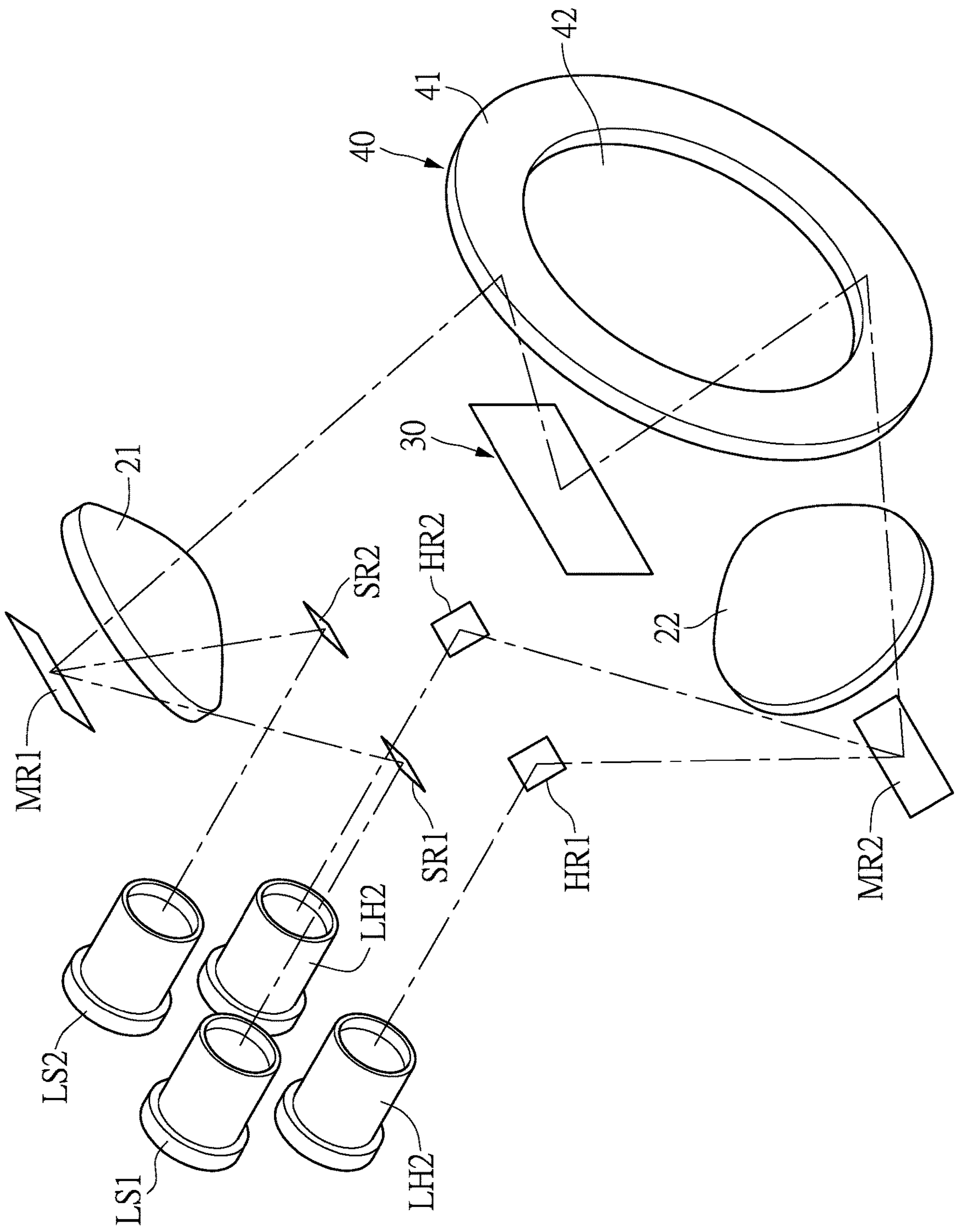
FIG. 2 is a schematic view of the smart projection vehicle lamp according to the present disclosure.

Referring to FIG. 1 to FIG. 2, FIG. 1 is a schematic side view of a smart projection vehicle lamp according to the present disclosure, and FIG. 2 is a schematic view of the smart projection vehicle lamp according to the present disclosure. Certain elements are omitted from the illustration of FIG. 2 for sake of clarity. One embodiment of the present disclosure provides a smart projection vehicle lamp 100 having a lens optical axis X. The smart projection vehicle lamp 100 includes a plurality of laser light sources LS1, LS2, LH1, and LH2, a plurality of two-dimensional microelectromechanical system (MEMS) mirrors MR1 and MR2, a plurality of focusing lenses 21 and 22, a reflective phosphor plate 30, a narrow-band blue light reflector 40, and lens groups 50 and 60. The laser light sources LS1, LS2, LH1, and LH2 of the present disclosure can directly illuminate the plurality of two-dimensional MEMS mirrors MR1 and MR2 or be reflected to the plurality of two-dimensional MEMS mirrors MR1 and MR2. The lens optical axis X passes through a center of the lens groups 50 and 60.

Specifically, the smart projection vehicle lamp 100 of the present disclosure further includes a plurality of fixed reflectors SR1, SR2, HR1, and HR2. The plurality of fixed reflectors SR1, SR2, HR1, and HR2 are disposed between the plurality of laser light sources LS1, LS2, LH1, and LH2, and the plurality of two-dimensional MEMS mirrors MR1 and MR2, respectively. A plurality of laser light beams (represented by L1 and L1') of the plurality of laser light sources LS1, LS2, LH1, and LH2 illuminate the plurality of fixed reflectors SR1, SR2, HR1, and HR2 along a direction parallel to the lens optical axis X, and the plurality of fixed reflectors SR1, SR2, HR1, and HR2 reflect the plurality of laser light beams (represented by L1 and L1') to the plurality of two-dimensional MEMS mirrors MR1 and MR2. An arrangement of the plurality of fixed reflectors SR1, SR2, HR1, and HR2 can change positions of the plurality of laser light sources LS1, LS2, LH1, and LH2 to improve a spatial configuration in a vehicle lamp.

In this embodiment, the plurality of laser light sources LS1, LS2, LH1, and LH2 can be arranged adjacent to each other at a rear side of the lens groups 50 and 60. The plurality of laser light beams L1 and L1' emitted by the plurality of laser light sources LS1, LS2, LH1, and LH2 are parallel to the lens optical axis X. A quantity of the plurality of fixed reflectors SR1, SR2, HR1, and HR2 corresponds to a quantity of the plurality of laser light sources LS1, LS2, LH1, and LH2, and the plurality of fixed reflectors SR1, SR2, HR1, and HR2 are also located at the rear side of the lens groups 50 and 60. The fixed reflectors SR1, SR2, HR1, and HR2 are located between the plurality of laser light sources LS1, LS2, LH1, and LH2 and the reflective phosphor plate 30. The plurality of laser light beams L1 and L1' are reflected to the plurality of two-dimensional MEMS mirrors MR1 and MR2 by the fixed reflectors SR1, SR2, HR1, and HR2.

For example, the smart projection vehicle lamp includes two laser light sources for low-beams (LS1 and LS2) and two laser light sources for high-beams (LH1 and LH2), four fixed reflectors (SR1, SR2, HR1, and HR2), and two two-dimensional MEMS mirrors (MR1 and MR2). However, the present disclosure is not limited to the abovementioned quantities. The plurality of laser light beams L1 and L1' that are blue light emitted by the plurality of laser light sources LS1, LS2, LH1, and LH2 can have a wavelength of 450 nm. The two laser light sources for low-beams and the two laser light sources for high-beams correspond to the four fixed reflectors, respectively. One of the two two-dimensional MEMS mirrors MR1 corresponds to the two laser light sources for low-beams LS1 and LS2, and another one of the two two-dimensional MEMS mirrors MR2 corresponds to the two laser light sources for high-beams LH1 and LH2.

The plurality of two-dimensional MEMS mirrors MR1 and MR2 are correspondingly arranged on paths of the plurality of laser light beams L1 and L1' of the plurality of laser light sources LS1, LS2, LH1, and LH2. Specifically, the two two-dimensional MEMS mirrors MR1 and MR2 are disposed at a periphery of the four fixed reflectors SR1, SR2, HR1, and HR2. Two laser light beams of this embodiment, for example, the two laser light sources for low-beams LS1 and LS2 are dynamically reflected by a same one of the two two-dimensional MEMS mirrors MR1. A two-dimensional MEMS mirror is also referred to as a two-dimensional MEMS laser scanning mirror. The MEMS mirror in the present disclosure can be a one-dimensional MEMS mirror or a two-dimensional MEMS mirror. A reflector mirror that is driven can accurately deflect or turn laser light beams L2 and L2', such that the laser light beams L2 and L2' reach a target location at a specific time. For example, laser light beams L3 and L3' reciprocally scan a Z-shaped pattern rapidly to produce a planar light pattern.

In this embodiment, the focusing lenses 21 and 22 are convex lenses, and the smart projection vehicle lamp 100 includes the focusing lenses 21 and 22 to converge the laser light beam L3 that are reflected by the two two-dimensional MEMS mirrors MR1 and MR2 to arrive at the reflective phosphor plate 30.

The reflective phosphor plate 30 has a phosphor layer 31 and a reflective layer 32, and the reflective layer 32 is located on one side of the phosphor layer 31.

The present disclosure provides the narrow-band blue light reflector 40 that is capable of reflecting light having a wavelength of a blue light from a laser light source while allowing visible light to pass through the narrow-band blue light reflector 40. The narrow-band blue light reflector 40 is disposed between the plurality of focusing lenses 21 and 22 and the reflective phosphor plate.

Figure 3A:
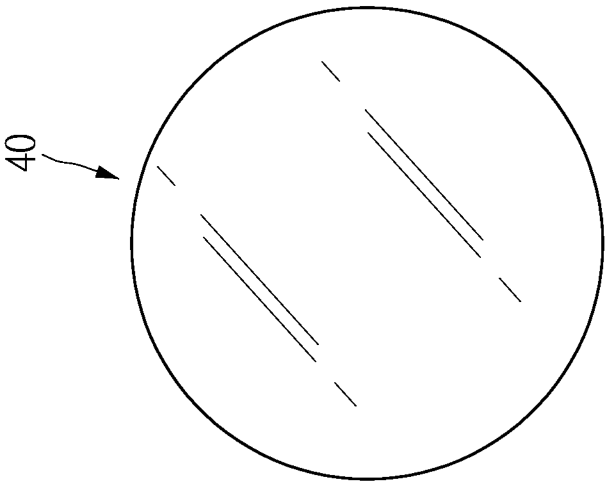
FIG. 3A is a schematic view of a dichroic filter according to the present disclosure.

As shown in FIG. 3A, the narrow-band blue light reflector 40 is a dichroic filter. Specifically, the dichroic filter is manufactured by using an optical vacuum coating manner to deposit multiple layers of optical films on an optical glass, so as to achieve wave filtering. The dichroic filter is an optical filter that allows lights having a specific wavelength to pass through the dichroic filter and reflects other lights. In this embodiment, the spectrum of the dichroic filter has a reflective band and a transmissive band. At a specific incident angle, such as 50 degrees, blue light of the plurality of laser light beams L3 and L3' that are converged is reflected by the reflective band of the narrow-band blue light reflector 40 and illuminates the reflective phosphor plate 30. The blue light of the plurality of laser light beams excites phosphor powder (i.e., phosphor particles 318 as shown in FIG. 1) of the phosphor layer 31 and is mixed into visible light W1 and W2 (i.e., white light). The visible light W1 and W2 are reflected by the reflective layer 32 of the reflective phosphor plate 30 and pass through the transmissive band of the narrow-band blue light reflector 40 to be emitted outward. The transmissive band of the dichroic filter allows the visible light W1 and W2 to pass through the dichroic filter. In this embodiment, according to characters of coatings, by controlling an incident angle A1 of the laser light beams L3 and L3' that travel to the dichroic filter, the blue light can be reflected to the reflective phosphor plate 30. Referring to FIG. 1, an incident angle defined by each of the plurality of laser light beams L3 and L3' that passes through the focusing lenses 21 and 22 and incidents to the narrow-band blue light reflector 40 and the lens optical axis X is greater than 40 degrees.

Figure 3B:
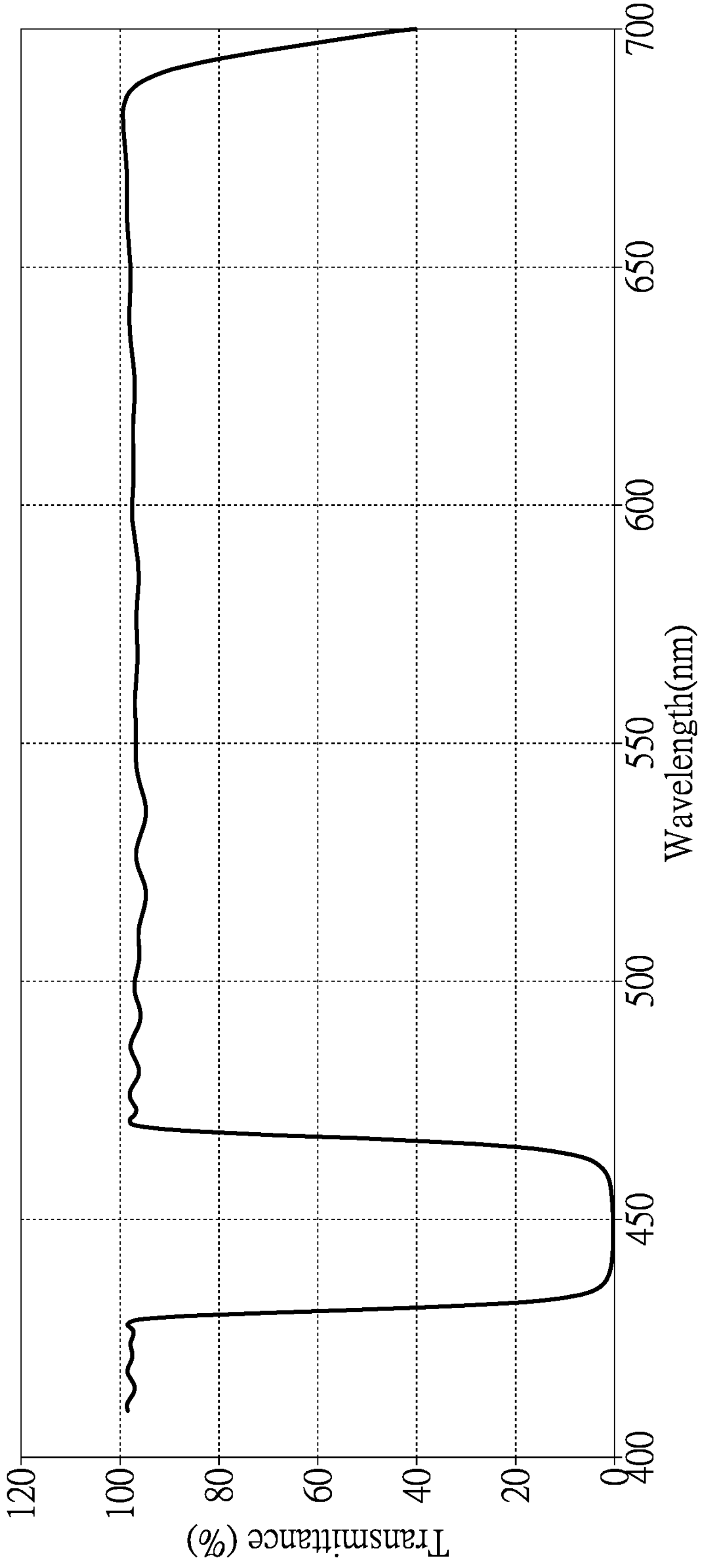
FIG. 3B is a curve chart of a dichroic filter spectrum of the dichroic filter according to the present disclosure.

As shown in FIG. 3B, which is to be read in conjunction with 3A, the blue light of a laser light beam is reflected by the narrow-band blue light reflector 40 and travels to the phosphor layer 31. The coating can be configured to have a greater reflectivity for blue lights having an incident angle of 50 degrees, particularly blue lights having wavelengths ranging from 440 nm to 460 nm, and have a higher transmissivity for lights having other wavelengths, such as lights having wavelengths greater than 470 nm. It should be noted that, the greater the incident angle A1 is, the greater the area produced by the same beam of light becomes. The incident angle defined by each of the plurality of laser light beams passing through the focusing lenses 21 and 22, and illuminating the narrow-band blue light reflector 45 and the lens optical axis X is 50 degrees, such that blue light having an incident angle of 50 degrees is reflected by the narrow-band blue light reflector 40, and visible light other than blue light having an incident angle of 50±2 degrees is allowed to pass through the narrow-band blue light reflector 40.

Figure 4:
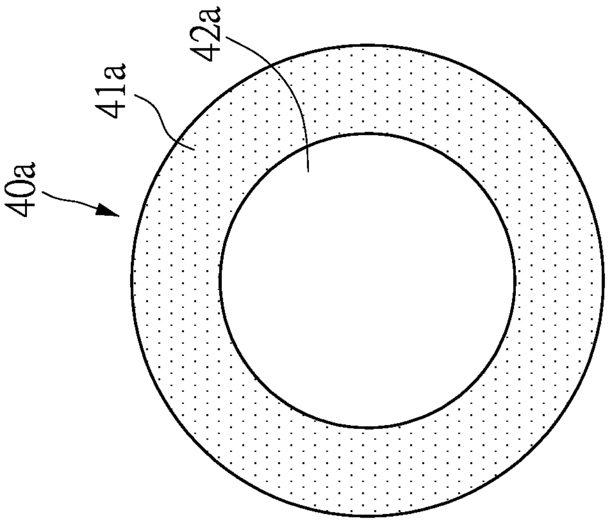
FIG. 4 is an annular blue light reflector according to the present disclosure.

As shown in FIG. 4, the present disclosure is not limited to the abovementioned embodiment, and a narrow-band blue light reflector in this embodiment can be an annular blue light reflector 40*a*. The annular blue light reflector 40*a* has a reflective portion 41*a* and a transmissive portion 42*a*. The reflective portion 41*a* is capable of reflecting the laser light beams L3 and L3'. The transmissive portion 42*a* can be a perforation that allows visible light (i.e., visible light W1 and W2) to pass therethrough. Referring to FIG. 1, an incident angle defined by the laser light beams L3 passing through the focusing lenses 21 and 22 and illuminating the annular blue light reflector 41*a* and the lens optical axis is greater than 45 degrees. However, the present disclosure is not limited thereto, and the transmissive portion 42*a* can be a transparent substrate without any coating.

The narrow-band blue light reflector 40 and the annular blue light reflector 40*a* of the present disclosure are disposed between the lens group 50 and 60, and the reflective phosphor plate 30. Advantages of such design include that, laser light sources can be reflected and a back focal length of a lens can be shortened, and a light collecting efficiency of the lens can be improved.

Reference is further made to FIG. 1, in one embodiment, the phosphor layer 31 includes the phosphor particles 318 and a plurality of scattering particles 319, the plurality of laser light beams L4 and L4' are blue light, and yellow light is generated after the phosphor particles 318 are excited by the plurality of laser light beams L4 and L4'. The plurality of scattering particles 318 are used to scatter the blue light, and the blue light is mixed with the yellow light to generate white light (i.e., visible light W1 and W2). By the refraction and scattering of the phosphor layer 31, a light-emitting angle A2 defined by the visible light W2 and the lens optical axis X is less than 30 degrees. In this embodiment, a volume ratio of the scattering particles 319 is from 0.1% to 20% of the phosphor layer 31, and a particle size of the scattering particles 319 ranges from 1 μm to 30 μm.

Figure 5B:
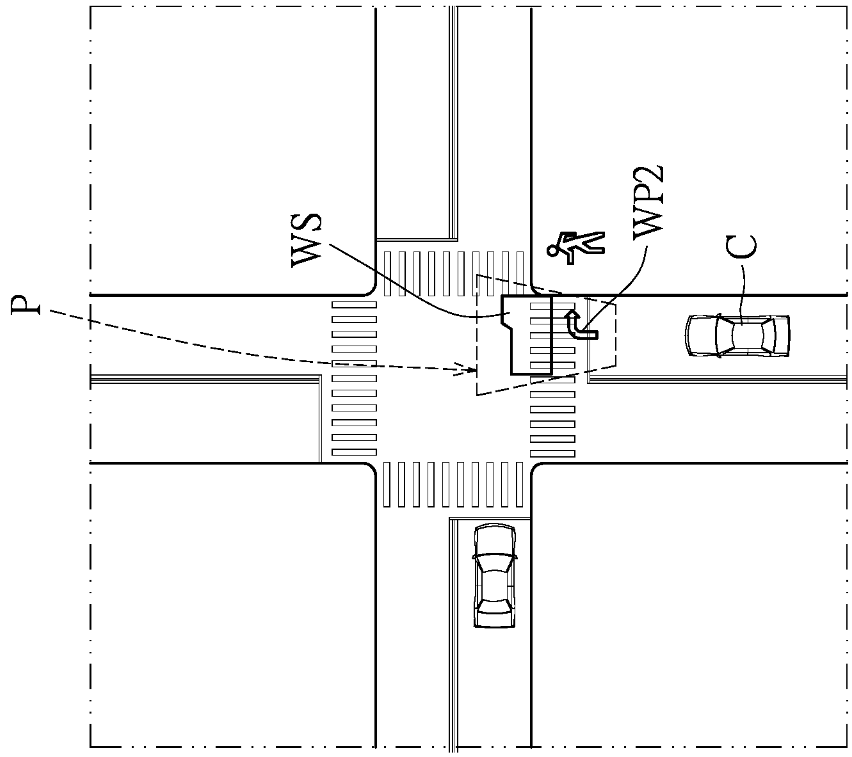
FIG. 5A and FIG. 5B are schematic views of projection light patterns of the smart projection vehicle lamp according to the present disclosure.
Figure 5A:
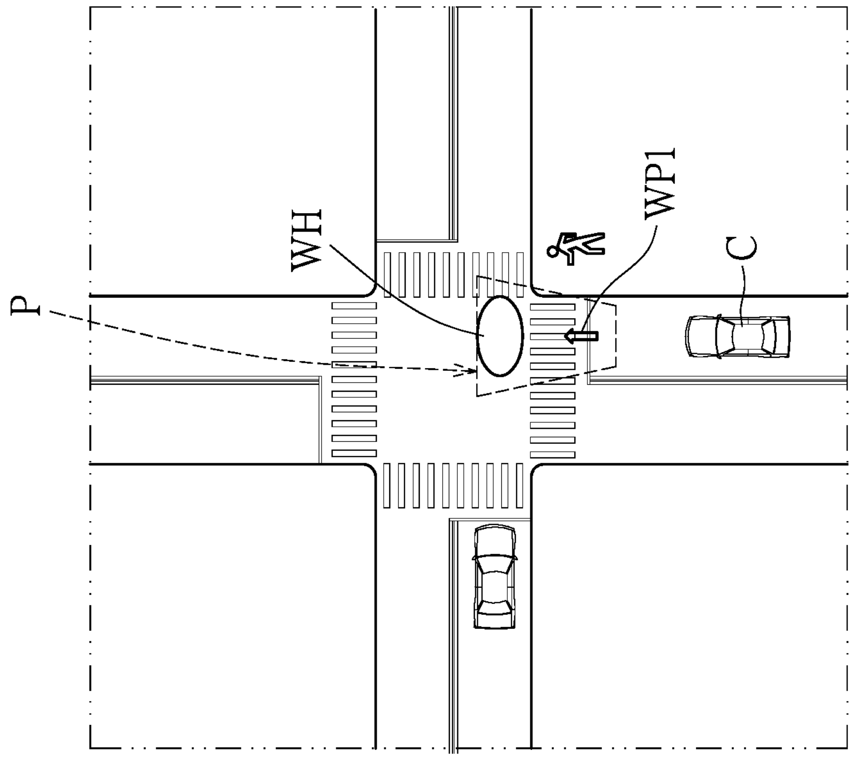

As shown in FIG. 5A and FIG. 5B, a projection light pattern P of the smart projection vehicle lamp 100 of the present disclosure includes a low-beam region WS, a high-beam region WH, and a symbol region such as a ground projection symbol WP1 of a forward movement arrow and a ground projection symbol WP2 of a right turn arrow for alerting pedestrians or other vehicles in a more specific manner.

Figure 6:
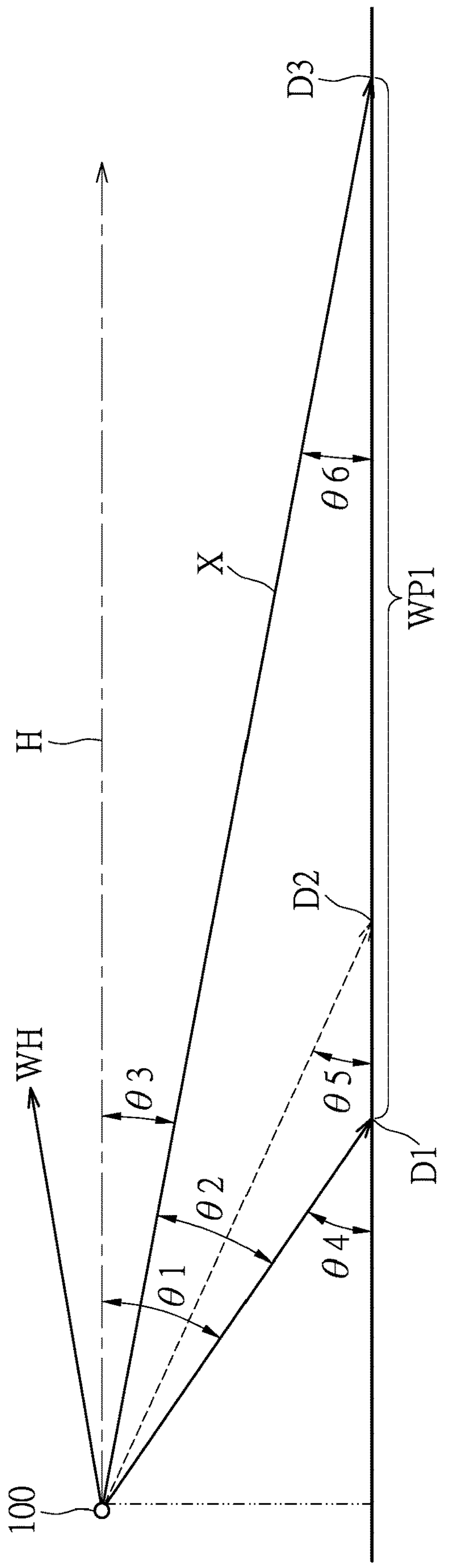
FIG. 6 is a schematic view of projection angle range of the smart projection vehicle lamp according to the present disclosure.

Referring to FIG. 6, from a side view, in the smart projection vehicle lamp 100 of the present disclosure, the light of the high-beam region WH is projected outward by approximately 3 degrees upward and 3 degrees downward (as represented by an angle θ3) relative to a horizontal axis H. A lowest light of the smart projection vehicle lamp 100 is projected to a location on road approximately 4.75 m from the smart projection vehicle lamp 100.

An angle θ1 defined by the lowest light and the horizontal axis H is approximately 9 degrees relative to the lens optical axis X, and the lens optical axis X is projected to a location approximately 14.3 m from the smart projection vehicle lamp 100, in compliance with regulations. An angle θ6 defined by the lens optical axis X and the ground is approximately 3 degrees. In the present disclosure, the symbol region can be located between the lens optical axis X and the lowest light. In other words, a range of an angle θ5 of the symbol region is between an angle θ4 and angle θ6. The angle θ4 is equal to the angle θ1 and can be as great as 9 degrees. Specifically, the angle θ5 of the symbol region can be between 3 degrees at which the symbol region is the farthest, and 9 degrees at which the symbol region is the nearest from the smart projection vehicle lamp 100.

FIG. 7A to FIG. 7D respectively show four configuration modes of the phosphor layer 31 of the smart projection vehicle lamp 100 according to the present disclosure. The phosphor layer 31 of the reflective phosphor plate 30 is defined into four sections corresponding to the lens optical axis X, and the four sections are similar to four quadrant sections. The smart projection vehicle lamp 100 can project the high-beam region WH, the low-beam region WS, and the symbol regions (such as the ground projection symbols WP1 and WP2) having different configurations. In addition, the lens optical axis X is located at a geometric center of the phosphor layer 31, and the horizontal axis H of light patterns is located under the lens optical axis X.

Figure 7A:
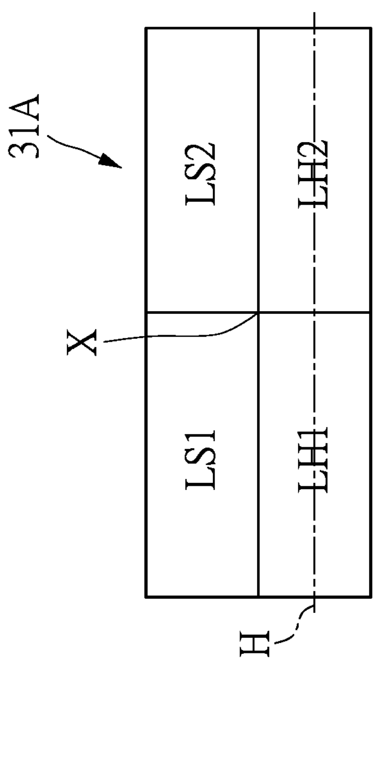
FIG. 7A is a schematic view of a first configuration mode of a phosphor layer according to the present disclosure.

Specifically, the FIG. 7A shows a low-speed fully switched-on mode, in which the four laser light sources (LS1, LS2, LH1, and LH2) are all switched on and respectively scan one fourth of an area of a phosphor layer 31A. By the refraction of the lens groups 50 and 60, a shape of a projected light pattern is vertically opposite and horizontally opposite to a shape of a section that is scanned by one of the laser light sources. Two upper sections are scanned by the two laser light sources for low-beams (LS1 and LS2), and two lower sections are scanned by the two laser light sources for high-beams (LH1 and LH2). A lower edge of the phosphor layer 31A is a farthest range of a projection light pattern region as shown in FIG. 6, and an upper edge of the phosphor layer 31A is a nearest range of the projection light pattern region as shown in FIG. 6.

Figure 7B:
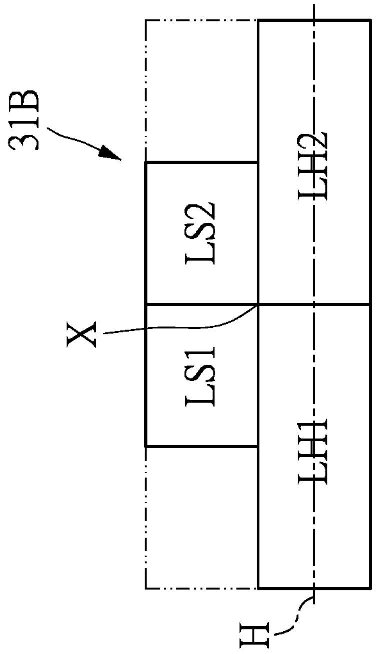
FIG. 7B is a schematic view of a second configuration mode of the phosphor layer according to the present disclosure.

The FIG. 7B shows an urban mode, in which the four laser light sources (LS1, LS2, LH1, and LH2) are all switched on. However, comparing to sections corresponding to low-beams in the low-speed fully switched-on mode as shown in FIG. 7A, sections corresponding to low-beams located at an upper half of a phosphor layer 31B have approximately half of a width of sections corresponding to high-beams as shown in FIG. 7A.

Figure 7C:
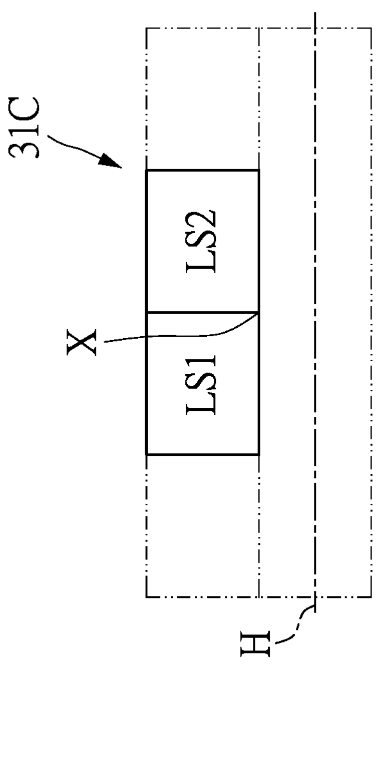
FIG. 7C is a schematic view of a third configuration mode of the phosphor layer according to the present disclosure.

The FIG. 7C shows a symbol projection mode, in which the two laser light sources for low-beams (LS1 and LS2) are switched on, and the two laser light sources for high-beams are not switched on. A symbol section of a phosphor layer 31C is configured to be from a center of the phosphor layer 31C to an upper edge of the phosphor layer 31C. Comparing to the urban mode as shown in FIG. 7B, two sections at a lower half of the phosphor layer 31C are not scanned. After projection, according to FIG. 6, the symbol region is located on the ground between projections of the lens optical axis X and the lowest light.

Figure 7D:
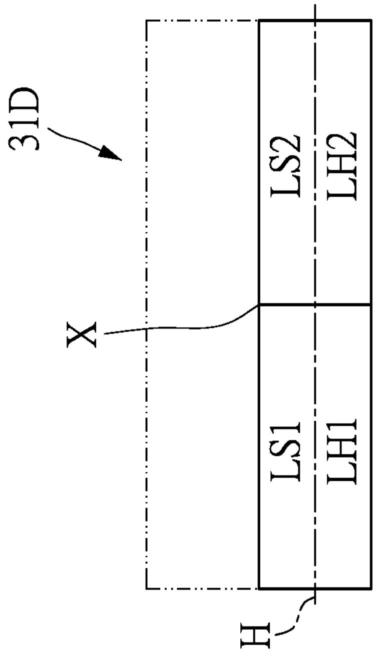
FIG. 7D is a schematic view of a fourth configuration mode of the phosphor layer according to the present disclosure.

FIG. 7D shows a high-beam high-speed mode, in which the four laser light sources (LS1, LS2, LH1, and LH2) are all switched on to provide high brightness, and the light patterns are projected at a farther range that corresponds to a range defined between the horizontal axis H and an upper limit of the high-beam region WH in FIG. 6. In this mode, the two upper sections that correspond to low-beams are not scanned, and only the two lower sections that correspond to high-beams are scanned. The two laser light sources for low-beams (LS1 and LS2) scan upper half regions of the two lower sections, and the two laser light sources for high-beams (LH1 and LH2) scan lower half regions of the two lower sections.

FIG. 8A to FIG. 8D are four projection light patterns that respectively correspond to the configuration modes of the phosphor layers of the FIG. 7A to FIG. 7D. A projection light pattern PA of FIG. 8A corresponds to the low-speed fully switched-on mode as shown in FIG. 7A. The projection light pattern PA has a range formed by a projection at an angle of approximately ±15 degrees horizontally with respect to the lens optical axis X, an angle of approximately 3 degrees above the horizontal axis H, and an angle of approximately 9 degrees below the horizontal axis H.

Figure 8A:
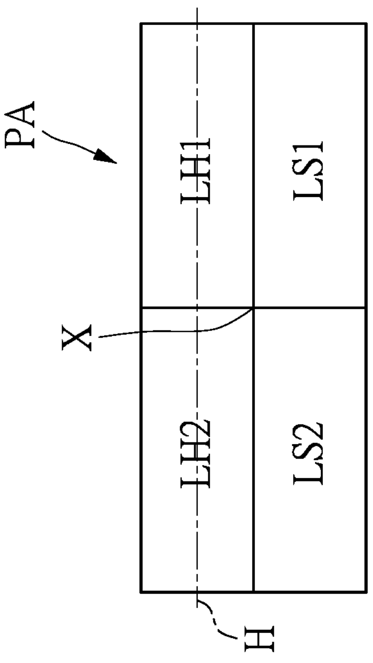
FIG. 8A is a schematic view of a projection light pattern corresponding to FIG. 7A according to the present disclosure.
Figure 8B:
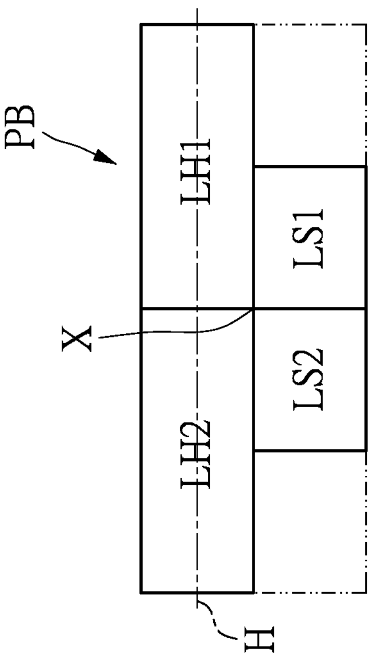
FIG. 8B is a schematic view of a projection light pattern corresponding to FIG. 7B according to the present disclosure.

A projection light pattern PB of FIG. 8B corresponds to the urban mode as shown in FIG. 7B. The smart projection vehicle lamp 100 of the present disclosure provides a projection light pattern for the urban mode. The phosphor layer 31B corresponding to the urban mode is configured to have two symbol sections that are located above the lens optical axis X and correspond to the two laser light sources for low-beams LS1 and LS2, respectively. A total width of the two symbol sections is less than half of a total width of the phosphor layer 31B. The projection light pattern PB has a main illuminance region located above the lens optical axis X and a range formed by a projection at an angle of approximately ±15 degrees horizontally with respect to the lens optical axis X, an angle of approximately 3 degrees above the horizontal axis H, and an angle of approximately 9 degrees below the horizontal axis H.

Figure 8C:
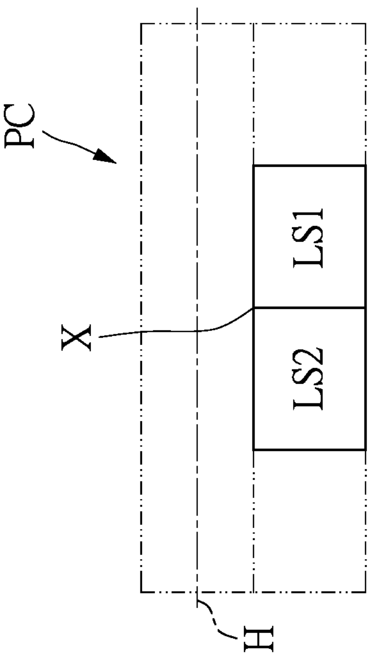
FIG. 8C is a schematic view of a projection light pattern corresponding to FIG. 7C according to the present disclosure.

A projection light pattern PC of FIG. 8C corresponds to a symbol projection mode as shown in FIG. 7C and is suitable for when the environment light is sufficient. The projection light pattern PC has a range formed by a projection at an angle of approximately ±7 degrees horizontally with respect to the lens optical axis X, and an angle of approximately 3 degrees above and below a horizontal line (not shown in the figures) passing through centers of the symbol regions.

Figure 8D:
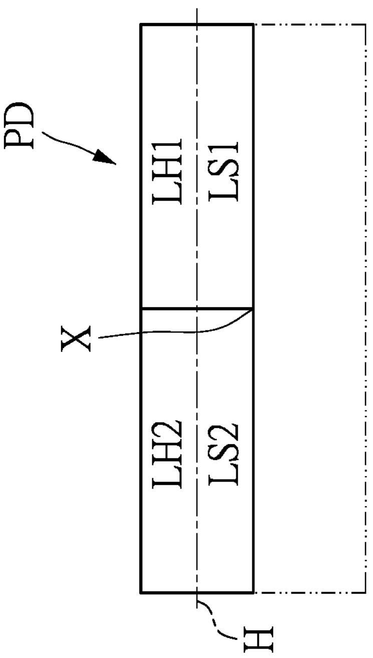
FIG. 8D is a schematic view of a projection light pattern corresponding to FIG. 7D according to the present disclosure.

A projection light pattern PD of FIG. 8D corresponds to a high-beam and high-speed mode as shown in FIG. 7D. The projection light pattern PD has a range formed by a projection at an angle of approximately ±15 degrees horizontally with respect to the lens optical axis X, and an angle of approximately 1.5 degrees above and below the horizontal axis H.

Beneficial Effects of the Embodiments

In conclusion, the smart projection vehicle lamp provided by the present disclosure includes the plurality of laser light sources that are used in cooperating with the plurality of two-dimensional MEMS mirrors. By the plurality of laser light beams being reflected by the narrow-band blue light reflector, different sections can be scanned on the reflective phosphor plate to form a plurality of projection light patterns that correspond to at least a symbol projection mode.

Furthermore, in the smart projection vehicle lamp provided by the present disclosure, the narrow-band blue light reflector is disposed between the lens group and the reflective phosphor plate, such that laser light sources can be reflected and a back focal length of a lens can be shortened, and a light collecting efficiency of the lens can be improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A smart projection vehicle lamp having a lens optical axis, comprising:

a plurality of laser light sources;

a plurality of two-dimensional micro-electromechanical system (MEMS) mirrors correspondingly arranged on paths of a plurality of laser light beams of the plurality of laser light sources, wherein the plurality of laser light beams are dynamically reflected by the plurality of two-dimensional MEMS mirrors;

a plurality of focusing lenses configured to converge the plurality of laser light beams reflected by the plurality of two-dimensional MEMS mirrors;

a reflective phosphor plate having a phosphor layer and a reflective layer, wherein the reflective layer is located on one side of the phosphor layer;

a narrow-band blue light reflector disposed between the plurality of focusing lenses and the reflective phosphor plate, wherein the narrow-band blue light reflector is configured to reflect blue wavelength light in the laser light source while allowing part of visible light to pass through the narrow-band blue light reflector, and the plurality of laser light beams that are converged are reflected by the narrow-band blue light reflector to illuminate the reflective phosphor plate; wherein the plurality of laser light beams excite the phosphor layer and are mixed into visible light, and the visible light is reflected by the reflective layer of the reflective phosphor plate to pass through the narrow-band blue light reflector; and a lens group, wherein the narrow-band blue light reflector is disposed between the lens group and the reflective phosphor plate.

2. The smart projection vehicle lamp according to claim 1, further comprising a plurality of fixed reflectors, wherein the plurality of fixed reflectors are disposed between the plurality of laser light sources and the plurality of two-dimensional MEMS mirrors, respectively; wherein the plurality of laser light beams from the plurality of laser light sources illuminate the plurality of fixed reflectors in a direction parallel to the lens optical axis, and the plurality of fixed reflectors reflect the plurality of laser light beams to the plurality of two-dimensional MEMS mirrors.

3. The smart projection vehicle lamp according to claim 2, wherein the smart projection vehicle lamp has two laser light sources for low-beams and two laser light sources for high-beams, four fixed reflectors, and two two-dimensional MEMS mirrors, and the two laser light sources for low-beams and the two laser light sources for high-beams correspond to the four fixed reflectors, respectively; wherein one of the two two-dimensional MEMS mirrors corresponds to the two laser light sources for low-beams, and another one of the two two-dimensional MEMS mirrors corresponds to the two laser light sources for high-beams.

4. The smart projection vehicle lamp according to claim 1, wherein the narrow-band blue light reflector is a dichroic filter, and the spectrum of the dichroic filter has a reflective band and a transmissive band; wherein the plurality of laser light beams that are converged are reflected by the reflective band of the dichroic filter and illuminate the reflective phosphor plate, and the plurality of laser light beams excite the phosphor layer and are mixed into visible light, the visible light is reflected by the reflective layer of the reflective phosphor plate and passes through the transmissive band; wherein an incident angle defined by each of the plurality of laser light beams passing through the focusing lenses and illuminating the narrow-band blue light reflector and the lens optical axis is greater than 40 degrees.

5. The smart projection vehicle lamp according to claim 4, wherein the incident angle defined by each of the plurality of laser light beams passing through the focusing lenses and illuminating the narrow-band blue light reflector and the lens optical axis is 50 degrees, such that blue light having an incident angle of 50 degrees is reflected by the narrow-band blue light reflector, and visible light other than blue light having an incident angle of 50±2 degrees is allowed to pass through the narrow-band blue light reflector.

6. The smart projection car lamp according to claim 1, wherein the narrow-band blue light reflector is an annular blue light reflector, and the annular blue light reflector has a reflective portion and a transmissive portion.

7. The smart projection vehicle lamp according to claim 6, wherein an incident angle defined by each of the plurality of laser light beams passing through the focusing lenses and illuminating the annular blue light reflector and the lens optical axis is greater than 45 degrees.

8. The smart projection vehicle lamp according to claim 1, wherein the phosphor layer includes phosphor particles and a plurality of scattering particles, the plurality of laser light beams are blue light, and yellow light is generated after the phosphor particles are excited by the plurality of laser light beams; wherein the plurality of scattering particles are used to scatter the blue light, and the blue light are mixed with the yellow light to generate white light; wherein a volume ratio of the scattering particles is 0.1% to 20% of the phosphor layer, and a particle size of the scattering particles ranges from 1 μm to 30 μm.

9. The smart projection vehicle lamp according to claim 1, wherein the phosphor layer of the reflective phosphor plate is defined into four sections relative to the lens optical axis, the four sections correspond to a high-beam region, a low-beam region, and a symbol region projected by the smart projection vehicle lamp and are capable of being configured into at least one projection light pattern; wherein the lens optical axis is located at a geometric center of the phosphor layer, and a horizontal axis of the at least one projection light pattern is located below the lens optical axis.

10. The smart projection vehicle lamp according to claim 9, wherein the smart projection vehicle lamp provides a projection light pattern for an urban mode, the phosphor layer in the urban mode is configured to have two symbol sections, and the two symbol sections are located above the lens optical axis and respectively correspond to two laser light sources for low-beams.

* * * * *